United States Patent [19]
Kuhn et al.

[11] Patent Number: 5,029,090
[45] Date of Patent: Jul. 2, 1991

[54] METHOD AND DEVICE FOR CONTROLLING PROPULSION IN MOTOR VEHICLES

[75] Inventors: Wolfgang Kuhn; Karl-Eugen Laubacher; Siegfried Neundorf, all of Stuttgart; Hans-Jürgen Strohm, Fellbach, all of Fed. Rep. of Germany

[73] Assignee: Daimler-Benz AG, Stuttgart, Fed. Rep. of Germany

[21] Appl. No.: 363,148

[22] Filed: Jun. 8, 1989

[30] Foreign Application Priority Data

Jun. 8, 1988 [DE] Fed. Rep. of Germany ....... 3819474

[51] Int. Cl.$^5$ .............................................. B60K 31/00
[52] U.S. Cl. ............................ 364/426.04; 364/431.07; 180/197
[58] Field of Search ...................... 364/426.04, 431.07, 364/424.05, 426.01; 303/100, 95, 97; 180/197

[56] References Cited

U.S. PATENT DOCUMENTS

| | | | |
|---|---|---|---|
| 4,747,051 | 5/1988 | Hall et al. ....................... | 364/426.04 |
| 4,794,539 | 12/1988 | Wallentowitz et al. ........ | 364/426.01 |
| 4,840,389 | 6/1989 | Kawabe et al. ................. | 364/424.05 |
| 4,869,334 | 9/1989 | Marumoto et al. ............ | 364/424.05 |

FOREIGN PATENT DOCUMENTS 0282041  9/1988  European Pat. Off. .

Primary Examiner—Parshotam S. Lall
Assistant Examiner—Tyrone Queen
Attorney, Agent, or Firm—Evenson, Wands, Edwards, Lenahan & McKeown

[57] ABSTRACT

A method for controlling propulsion in motor vehicles is described which detects when the vehicle approaches the limiting value for lateral acceleration independently of the condition of the load, the tires, the roadway and so forth in that a measurement value for the lateral acceleration, the yaw velocity or the difference of the front wheel speeds of rotation is compared with a mathematical value determined by the use of a mathematical formula, in which method this mathematical value is phase-delayed in a filter and corrected in a first correction unit and the mathematical formula used is corrected in a second correction unit.

16 Claims, 3 Drawing Sheets

METHOD AND DEVICE FOR CONTROLLING PROPULSION IN MOTOR VEHICLES

BACKGROUND AND SUMMARY OF THE INVENTION

The invention relates to a device and method for controlling propulsion in motor vehicles of the type generally disclosed in commonly assigned U.S. Pat. No. 4,794,539, which corresponds to German Published Unexamined Application (DOS) 3,545,715. In this patent, an arrangement is described in which a measurement value for the lateral vehicle acceleration, the yaw velocity or the speed difference between the front wheel speeds of rotation is compared with a mathematical value for this variable which is calculated from vehicle speed and steering angle, and if the values do not correspond, control signals are formed for the brakes of the wheels and/or for a power actuator of the vehicle engine. To obtain the most accurate possible values, adaptation electronics are provided which adjust the sensors needed for determining the input variables in the steady-state range of the roll steer characteristic of the vehicle so that identical speeds of rotation at all wheels and a steering angle of 0° are measured in straight driving and so forth.

Since, however, the formula used and thus the mathematical value rarely corresponds precisely to the actual situations and thus to the mathematical value, a tolerance range around the mathematical value is there provided which can be varied with the vehicle speed and the steering angle and within which the measurement value should be located so that no intervention in the brakes or the vehicle engine is caused. The narrower this tolerances range can be kept the more effective the control system can operate.

However, the accuracy of the result of the calculation does not only depend on accurately adjusted sensors and a correct formula, it is also determined by other factors.

Due to inertia, the build-up of, for example, a lateral acceleration occurs as response to a change in steering angle with delay. The mathematical formula is designed for steady-state driving conditions and uses the new steering angle as a basis for calculating a value of lateral acceleration which actually only occurs with a certain delay. In addition, for example, lateral accelerations can also be measured in the case of straight driving with accurately adjusted sensors if driving occurs, for example, on a laterally inclined roadway or with non-uniformly distributed load.

Wrong results can both be measured and also calculated due to dynamic driving conditions such as strong acceleration, fast changes in steering angle, due to different quantities and distributions of the load, tire condition, tire air pressure, roadway conditions and its slope and lateral inclination, but also due to inaccurate mounting of the sensors. As a result, either the tolerance range for the mathematical value must be greatly increased, which prevents effective control, or the results of measurements and calculations must become more accurate, that is to say freed of distorting influences.

The invention therefore has the object of specifying a method which takes into consideration and eliminates all above possibilities of distortion in the measurement and mathematical value and in this manner provides the possibility of obtaining an accurately operating propulsion control system.

The invention also has the object of creating an arrangement or device for carrying out this method.

According to the invention, this object is achieved by providing a method wherein controlling propulsion in motor vehicles in the sense of maintaining stable driving conditions, in which method a variable characterizing the steady-state driving condition is measured and a mathematical value which adequately represents this variable is calculated by means of the vehicle speed and the steering angle, and in which method measurement value and mathematical value are compared with one another and control signals for the brakes and/or for a power actuator of the vehicle engine are generated in accordance with the result of the comparison, characterized in that the mathematical value ($R_R$) is phase-delayed in dependence on at least one measurement variable (v) related to the dynamics of vehicle movement, that the difference between the phase-delayed mathematical value ($R_R$) and the measurement value (M) is subjected to an averaging over a predeterminable period and this averaged value is added to the phase-delayed mathematical value and that the mathematical value ($R_S$) corrected in this manner is compared with the measurement value, and that the difference (D) between the differences, produced in a particular time interval, of successive measurement values and phase-delayed mathematical values is formed and a particular parameter (EG) for calculating the mathematical value ($R_R$) is changed in accordance with the value of this difference. According to this method, the invention is based on a multiple evaluation of the difference between measurement value and mathematical value and on a subsequent influencing of the mathematical value or at least of a parameter of the mathematical formula used. Instead of influencing the mathematical value, influencing the measurement value for reducing the difference is also within the scope of the invention even if this possibility is not expressly described.

The method according to the invention is used in a device according to the invention which comprises an arrangement for carrying out the method referred to above, comprising sensors for determining the vehicle speed, the steering angle and a measurement value for a variable characterizing the steady-state driving condition, particularly the lateral vehicle acceleration, the yaw velocity or the speed difference of the steered wheels of one axle associated with the steering angle, comprising adaptation electronics for adjusting the sensors, comprising a computing unit for calculating a mathematical value which adequately corresponds to the measurement value and is associated with the vehicle speed and the steering angle or a tolerance range around this mathematical value by means of a predetermined mathematical formula, and comprising a comparison unit in which the measurement value is compared with the mathematical value or its tolerance range and the output signals of which are control signals for the brakes and/or for a power actuator of the vehicle engine, characterized in that an electric filter (F) is provided, the filter parameters of which (A, B, C, D) can be predetermined in dependence on at least the vehicle speed (v) and which can be supplied with the output signal ($R_R$ of the computing unit (R), that a first correction unit (S) is provided which is supplied with the output signal ($R_F$) of the filter (F) and the measurement value (M) as input variables and which forms the difference between those two values, subjects this difference to an averaging over a predetermined period and adds the result to the output signal (RF) of the filter (F), and that the mathematical value (Rs) corrected in this manner, together with the measurement value (M), are supplied as input variables to the comparison unit (K);

and that a second correction unit (L) is provided which is supplied with the output signal ($R_F$) of the filter (F) and the measurement value (M) as input variables and which forms the difference $\Delta M - \Delta R_F$) between the differences ($\Delta M; \Delta R_F$), produced in a certain time interval ($\Delta t$) of successive measurement values ($M_1; M_2$) and filer output signals ($R_{F1}; R_{F2}$), that a particular parameter (EG) of the mathematical formula used in the computing unit (R) can be changed in accordance with this difference ($\Delta M - \Delta R$).

Other objects, advantages and novel features of the present invention will become apparent from the following detailed description of the invention when considered in conjunction with the accompanying drawings.

DETAILED DESCRIPTION OF THE DRAWING

The illustrative embodiment described in the text which follows includes a method and a device for carrying out this method, in which the lateral acceleration $a_y$ of the vehicle is utilized as a variable characterizing the steady-state driving condition. If, instead of the lateral acceleration, the yaw velocity or the speed difference between the front wheels is used, neither the method nor the device changes but only the mathematical formula used and the parameters which can be changed in it.

For the sake of simplicity, the device or arrangement for carrying out the method according to the invention is described in the text which follows and the method itself is explained with reference to the operation of this device.

Figure 1:
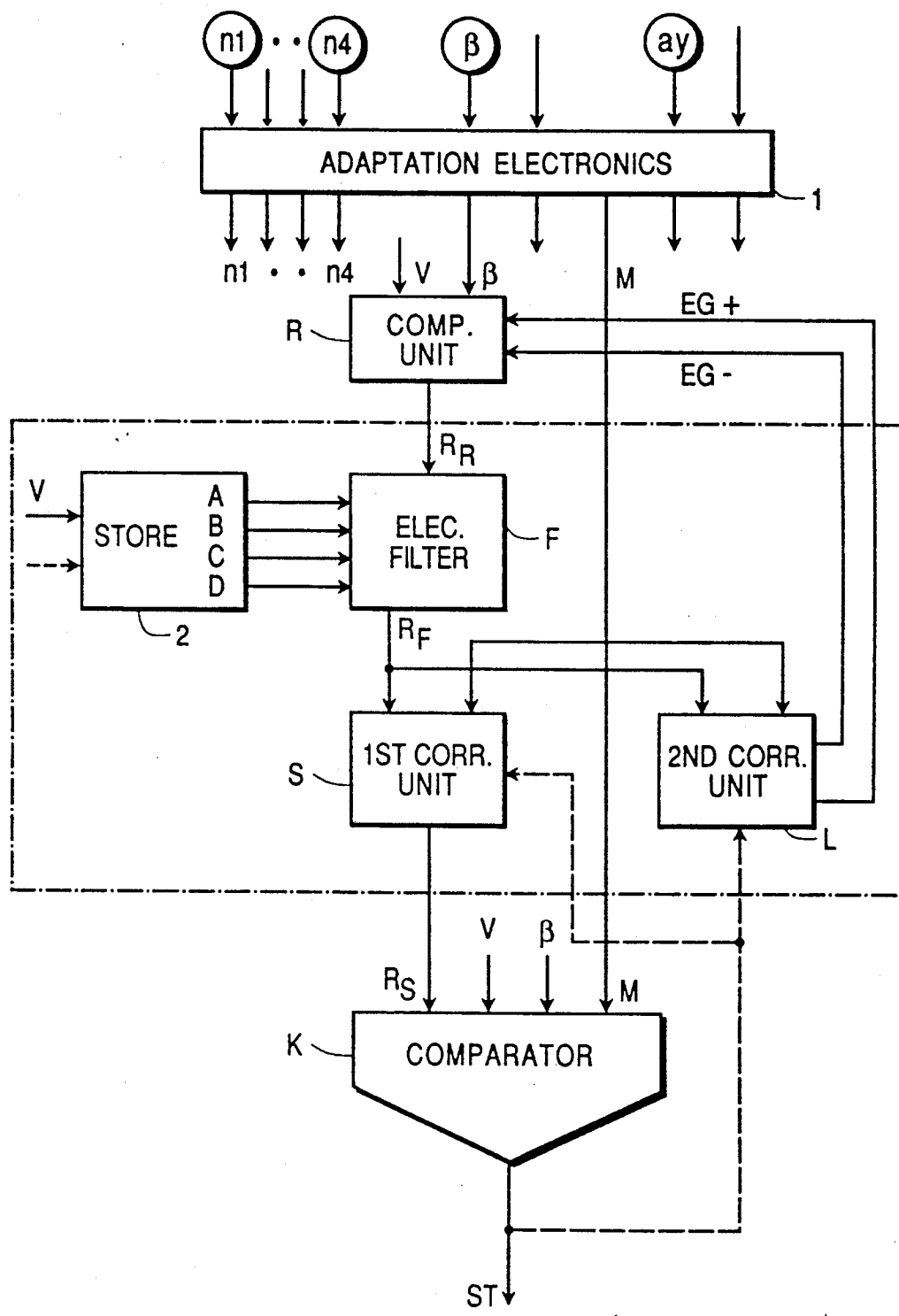
FIG. 1 shows a diagrammatic functional circuit diagram of an arrangement constructed according to a preferred embodiment of the present invention.

FIG. 1 shows a diagrammatic functional circuit diagram of the device. The actual novel features of the invention are represented within the field framed with a dot-dashed line and the device known from the above-noted U.S. Pat. No. 4,794,539 (German 005, 545,715) which will first be briefly represented, is shown outside this field.

The further details are to be based on a motor vehicle with conventional drive, that is to say with driven rear wheels and steerable front wheels.

The output signals of sensors which determine the wheel speeds of rotation $n_1$ to $n_4$ of the vehicle wheels, the steering angle $\beta$, the lateral acceleration $a_y$ and possibly also further variables are supplied to adaption electronics 1. In this arrangement, the sensors for the said variables are indicated by circles and other variables or sensors which are not needed here for this description, however, are only symbolized by arrows.

In the adaptation electronics, the output signals of the sensors are adjusted in the steady-state range of the roll steer characteristic of the vehicle, that is to say the speed signals are corrected under particular driving conditions (straight driving on a not laterally inclined roadway without vehicle acceleration or deceleration) in such a manner that they are of equal magnitude and the steering angle signal and the lateral acceleration signal are set to "zero".

The signals passed via the adaptation electronics 1 and needed in other places are treated correspondingly. This adaptively occurs whenever the conditions are satisfied as described above.

From the corrected speed signals, a signal for the vehicle speed v is derived in a manner not shown.

This signal and the corrected steering angle signal $\beta$ are now supplied to a computing unit R which calculates from these, using a predetermined formula, for example, $$a_y = \frac{A \cdot v^2 \cdot \beta}{1 + \frac{EG}{1} \cdot v^2} \quad (1)$$

where
$a_y$ = lateral vehicle acceleration
A = constant value
V = vehicle speed
$\beta$ = steering angle
EG = roll steer gradient of the vehicle
l = wheelbase of the vehicle,
a mathematical value ($R_R$) for the lateral acceleration of the vehicle. This occurs continuously at particular time intervals on the basis of a digitally operating overall device.

This mathematical value ($R_R$) or a tolerance range surrounding this value in dependence on the vehicle speed v and the steering angle $\beta$, is now compared with the measured value M of the lateral acceleration $a_y$ in a comparator K. If the measurement value M is above or below the mathematical value ($R_R$) or outside the tolerance range, control signals ST for operating the wheel brakes or a power actuator of the vehicle engine are output. The devices driven by the control signals ST are not represented in FIG. 1 as this much is known with regard to the known device which is used for keeping the vehicle within the limits of driving stability at any time.

This known device, however, does not take into consideration the time delay with which the measured value M occurs due to the inertia, compared with the mathematical value ($R_R$) so that the control cannot operate at its optimum.

For this reason, an electronic filter F is provided which essentially corresponds to a second-order low-pass filter having a transfer function $$F(S) = \frac{1 + A \cdot S + B \cdot S^2}{1 + C \cdot S + D \cdot S^2} \quad (2)$$

in this illustrative embodiment. In this arrangement a table for various values of the constants A, B, C and D is stored which are predetermined in dependence at least on the vehicle speed v and are stored in a store 2. Depending on the instantaneous value of the vehicle speed v (and possibly additional variables indicated by a dashed arrow) different filter constants are predetermined which have previously been empirically determined in driving tests. This has the effect that the mathematical value ($R_R$) is at least subjected to time delays which depend on the vehicle speed v so that it can match the measurement value M as accurately as possible. A filtered mathematical value $R_F$ appears at the output of the filter F.

It can also happen that a lateral acceleration is measured with an accurately adjusted lateral acceleration sensor even through the vehicle is moving straight ahead without acceleration, for example in the case of a laterally inclined roadway or with one-sided loading.

To compensate for such measurement uncertainties, a first correction unit S is provided which is supplied with the filtered mathematical value $R_F$ and the measurement value M. In this first correction unit S, the difference M-$R_F$ is formed and averaged over a predetermined period of, for example, 1s. This averaged difference is added to the filtered mathematical value.

This forces a correspondence between measurement and calculation if the difference changes only slowly. Fast and large changes in the difference between measurement value and mathematical value which are typical of drives within the limiting range of driving stability, however, are not compensated because of the period of averaging, so that a detection of the driving in that limiting range is not impaired by the first correction unit S. The mathematical value ($R_R$) corrected in this manner is compared with the measurement value in the comparator K in known manner.

In addition, a maximum permissible value can be predetermined for the averaged difference, that is to say for the correction of the mathematical value.

As has already been initially mentioned, the mathematical formula used has been designed for steady-state driving conditions so that it does not become too complicated.

Since the steady-state roll steer characteristic of the vehicle changes with loading, tire conditions and so forth, the mathematical values generally do not precisely correspond to the measurement values (with constant coefficients in the mathematical formula).

For this reason, a second correction unit L is provided which changes a parameter in the mathematical formula (1)—the roll steer gradient EG in this illustrative embodiment—on the basis of the difference of the time changes of measurement value and mathematical value in the sense of reducing this difference.

For this purpose, the second correction unit L is supplied with the filtered mathematical value ($R_R$) and the measurement value M which determines from these this difference and output signals for increasing or decreasing the parameter "EG" to the computing unit depending on whether this difference is positive or negative or exceeds or drops below a tolerance range around the value "zero".

To avoid distortions, particularly in the averaging in the first correction unit S and the forming of differences in the second correction unit L in the case of non-steady-state driving conditions, the averaging and the difference-forming is inhibited in these units when the control signals ST occur which is indicated by the feed of the signal ST to the correction units S and L being drawn with a dashed line in FIG. 1.

Thus, the invention essentially produces a phase shift in the mathematical value and a correction of the mathematical value and the mathematical formula by multiple evaluation of the difference between measurement value and mathematical value.

Figure 2:
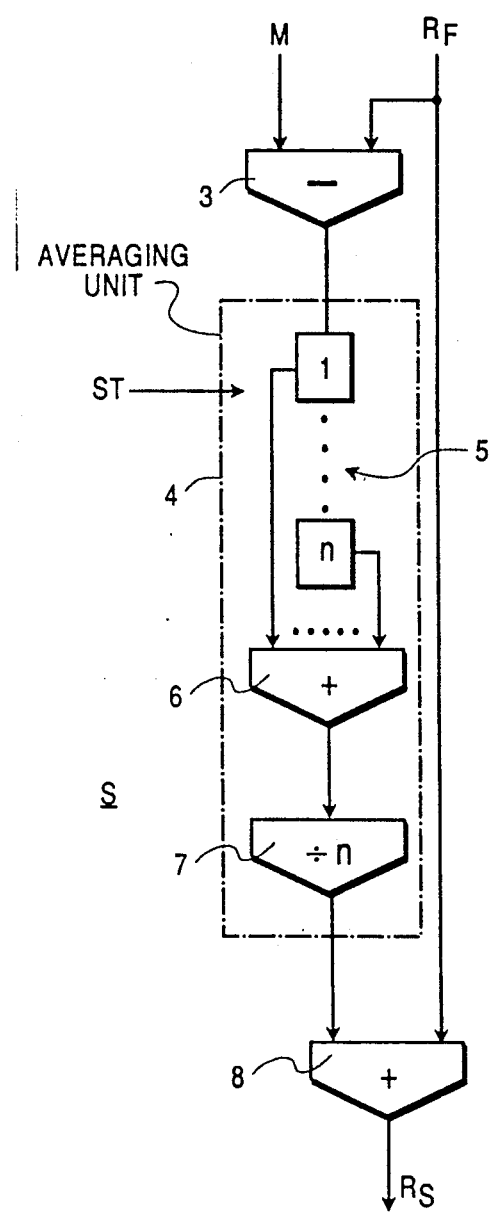
FIG. 2 shows a diagrammatic functional circuit diagram of the first correction unit of the arrangement of FIG. 1.
Figure 3:
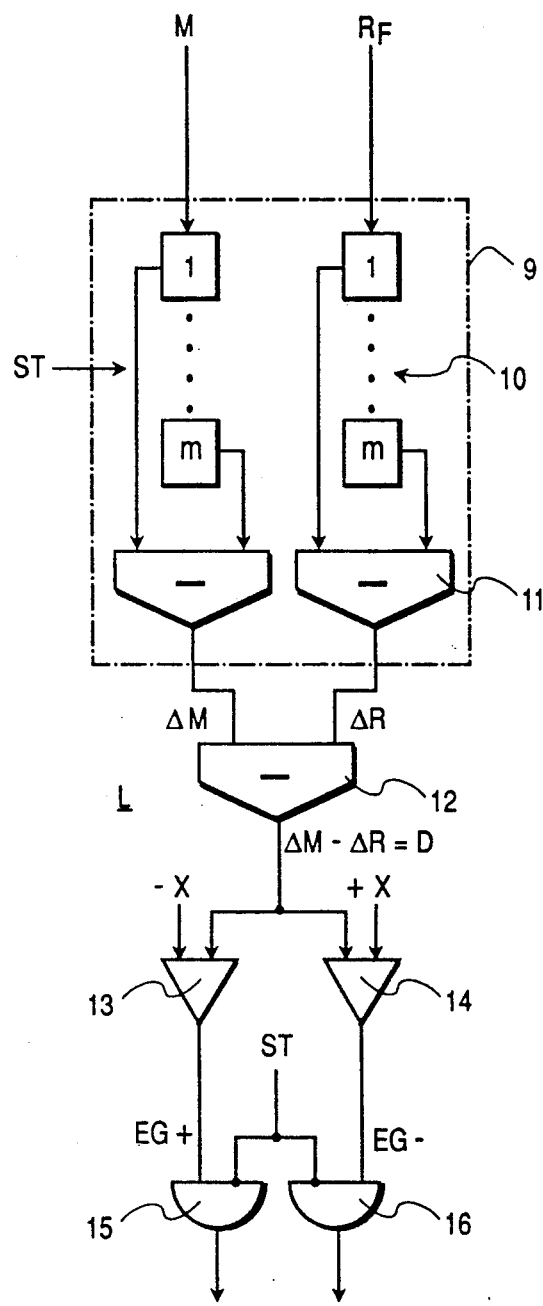
FIG. 3 shows a diagrammatic functional circuit diagram of the second correction unit of the arrangement of FIG. 1.
Figure 4:
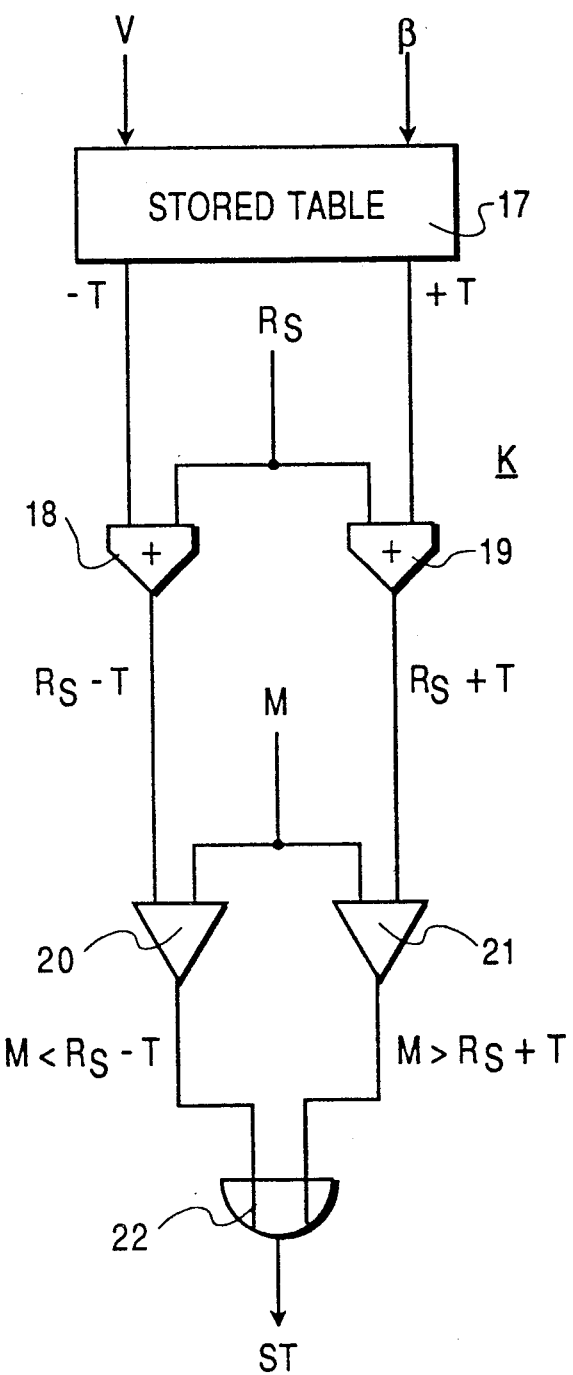
FIG. 4 shows a diagrammatic functional circuit diagram of the comparison unit of the arrangement of FIG. 1.

FIGS. 2 to 4 show illustrative embodiments of the first and second correction unit and of the comparator.

Thus, FIG. 2 shows an illustrative embodiment of the first correction unit S. This exhibits at the input a subtracting element 3 in which the difference M-$R_F$ between the measurement value and the filtered mathematical value is formed. This difference is formed continuously (clock pulse by clock pulse) and supplied to a subsequent averaging unit 4 which is framed with a dot-dashed line. This averaging unit 4 consists of the series circuit of an n-stage shift register 5, and an adding element 6 having n inputs and a dividing element 7.

The difference M-$R_F$ formed in the subtracting element 3 is transferred clock pulse by clock pulse into the shift register 5 and shifted by one stage with each further clock pulse. The values in the shift register stage are added clock pulse by clock pulse in the adding element 6 and the sum formed is subsequently divided by the number n in the dividing element 7. The number n of shift register stages is obtained from the desired period of averaging (for example 1 S) divided by the clock period (for example 0.1 S). In this example, the selected values result in the number 10 for n.

The value appearing at the output of the dividing element 7 which, at the same time, is the output of the averaging unit 4, corresponds to the difference averaged over the predetermined period. This value is added with the correct sign to the filtered mathematical value $R_F$ in an adding element 8. The sum produced is the output value $R_S$ of the first correction unit, which is supplied to the comparator K. The arrow designated by ST which points to the shift register 5 is intended to indicate that the shift register 5 remains blocked during the period of an output signal ST of the comparator K so that the averaging is not impaired by non-steady-state events as has already been explained before.

FIG. 3 shows an illustrative embodiment of the second correction unit L. This correction unit is also supplied with the measurement value M and the filtered mathematical value $R_F$.

In a box 9 framed with a dot-dashed line, the change with time is first separately determined for each of the two values. This will first be described for the mathematical value $R_F$.

The mathematical value $R_F$ is transferred into a shift register 10 which has at least two stages, and is shifted through at a predetermined clock rate. Depending on whether the time interval, within which the change of the mathematical value $R_F$ is to be determined, corresponds to the clock interval or to a multiple thereof, two or a corresponding number of shift register stages are required. The oldest value $R_{F1}$ is subtracted from the youngest value $R_{F2}$ in a subtracting element 11 following the shift register 10. The difference $R_{F2} - R_{F1} = \Delta R$ produced is a measure of the time change $\Delta R_F / \Delta t = (R_{F2} - R_{F1})/(t_2 - t_1)$.

The difference $M_2 - M_1 = \Delta M$ is determined in exactly the same manner for the measurement value as a measure of its change with time $\Delta M / \Delta t = (M_2 - M_1)/(t_2 - t_1)$.

The values appearing at the output of the two subtracting elements 11 are subtracted from one another in a further subtracting element 12 so that the difference $D = \Delta M - \Delta R$ appears with the correct sign at the output of the subtracting element 12. This difference is zero if measurement value and mathematical value are parallel to one another, it is negative if the mathematical value rises at a greater rate or drops at a lower rate than the measurement value; and it is positive if the mathematical value rises at a lower rate or drops at a lighter rate than the measurement value.

The output signal of the subtracting element 12 is supplied to a window comparator formed of two comparators 13 and 14, in which it is compared with two limit values $+X$ and $-X$ which define a tolerance range around the value "zero". If D is more negative than the limit value $-X$, the comparator 13 outputs an output signal EG+ and if D is more positive than the limit value $+X$, the comparator 14 outputs an output signal EG—. Both output signals pass through one inhibiting gate 15 and 16 each which they can only pass if there is no control signal ST at the output of the comparator K (FIG. 1).

At the same time, the shift registers 10 are blocked for as long as there is a control signal ST which is indicated by an arrow ST at the dot-dashed box 9.

As is shown in FIG. 1, the two signals EG+ and EG— go as output signals of the second correction unit L to the computing unit R where they cause a change in the parameter EG in the mathematical formula (1) for as long as they are present.

An EG+ signal causes an increase in the value EG and thus, since this value is in the nominator of the formula (1), a decrease in the mathematical value $R_R$ for the lateral acceleration $a_y$. Correspondingly, an EG— signal causes a decrease in the value EG and thus an increase in the mathematical value $R_R$ in the sense of the correction to be performed.

Distortion in the mathematical result is prevented by changing the parameter EG in small steps at a predetermined rate (for example 3/s). To prevent distortions in the case of non-steady-state steering manoeuvres, the maximum value of adaption of the mathematical value $R_R$ can be limited.

FIG. 4 shows an illustrative embodiment of the known comparator K which, however, is not specified in greater detail in the above-noted U.S. Pat. No. 3,794,539 (German DOS 3,545,715). As can be seen from FIG. 1, the comparator K is supplied with the measurement value M and the corrected mathematical value $R_S$ and in it the measurement value is compared with a tolerance range formed around the mathematical value. The width of this tolerance range is dependent on the vehicle speed and the steering angle.

To determine this tolerance range, a stored table 17 is provided in FIG. 4 in which values $\pm T$ are laid down, which depend on the vehicle speed v and on the steering angle $\beta$ and are output in accordance with the current values of v and $\beta$.

If the tolerance range is symmetric with respect to the mathematical value, a single value T is in each case sufficient, if not, a positive value $+T$ and a negative value $-T$ must be stored. If the latter is the case, the output value $+T$ is added to the corrected mathematical value $R_S$ in an adding element 19. The sum $R_S+T$ forms the top limit value. Correspondingly, the value $-T$ is added to the corrected mathematical value $R_S$ in a second adding element 18. The sum $R_S-T$ forms the bottom limit value.

The measurement value M is compounded with these two limit values in two comparators 20 and 21. The output signals of these two comparators are combined via an OR element 22 to form a control signal ST which appears when the measurement value either drops below the bottom limit value or exceeds the top limit value.

This control signal ST is further used in known manner for controlling the wheel brake and/or a power actuator of the vehicle engine which is not shown.

The measures described ensure that it is possible safely and reliably to detect independently of the condition of the load, the tires, the roadway and other variables, with little measuring expenditure, when a vehicle approaches the limiting range of lateral acceleration. The entire device described can be represented by appropriately programmed microprocessors or microcomputers.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Method for controlling propulsion in motor vehicles in the sense of maintaining stable driving conditions comprising the steps of:

calculating a variable characterizing the steady-state driving condition;

calculating successive mathematical values ($R_R$) which adequately represent the variable from the vehicle speed and the steering angle continuously at time intervals;

calculating a mathematical value ($R_R$) from each mathematical value ($R_R$);

comparing a measurement value (M) and each mathematical value ($R_S$) with one another; and generating control signals for at least one of the brakes and/or for a power actuator of the vehicle engine in accordance with a result of the step of comparing;

wherein the step of calculating the mathematical value ($R_S$) from the mathematical value ($R_R$) comprises the steps of:

phase-delaying the mathematical value ($R_R$) depending on at least one measurement variable (v) related to the dynamics of vehicle movement;

averaging a difference between the phase-delayed mathematical value ($R_R$) and the measurement value (M) over a predeterminable period to produce an averaged value and;

adding the averaged value to the phase-delayed mathematical value ($R_R$) to produce the mathematical value ($R_S$);

wherein the mathematical value ($R_S$) is compared with the measurement value (M), and wherein a difference (D) between differences of measurement values and phase-delayed mathematical values produced in successive time intervals is formed, and a particular parameter (EG) for calculating the mathematical value ($R_R$) is changed in accordance with the value of this difference (D).

2. Apparatus for carrying out a method for controlling propulsion in motor vehicles in the sense of maintaining stable driving conditions, in which method a variable characterizing the stead-state driving condition is measured and a mathematical value which adequately represents this variable is calculated by means of the vehicle speed and the steering angle, and in which method a measurement value and the mathematical value are compared with one another and control signals for at least one of the brakes and for a power actuator of the vehicle engine are generated in accordance wit the result of the comparision, said apparatus comprising:

sensors for determining the vehicle speed, the steering angle and a measurement value for a variable characterizing the steady-state driving condition, particularly the lateral vehicle acceleration, the yaw velocity, or the speed difference of the steered wheels of one axle associated with the steering angle;

a computing unit for calculating a mathematical value which adequately corresponds to the measurement value and is associated with the vehicle speed and the steering angle or a tolerance range around this mathematical value by means of a predetermined mathematical formula;

a comparison unit in which the measurement value is compared with the mathematical value or its tolerance range, the comparison unit producing output signals which are control signals for at least one of the brakes and a power actuator of the vehicle engine;

an electric filter having filter parameters which can be predetermined in dependence on at least the vehicle speed (v) and which is coupled to receive an output signal ($R_R$) of the computing unit;

a first correction unit coupled to receive an output signal ($R_F$) of the filter and the measurement value (M) as input variables for calculating a difference between the output signal ($R_F$) and the measurement value (M), averaging the difference over a predetermined period, and adding the averaged difference to the output signal value (RF) of the filter to produce a mathematical value ($R_S$), wherein the mathematical value ($R_S$) and the measurement value (M) are supplied as input variables to the comparison unit; and a second correction unit coupled to receive the output signal ($R_F$) of the filter and the measurement value (M) as input variables for calculating a difference (WM—$WR_F$) between differences (WM;$WR_F$), produced in a certain timer interval (Wt) of successive measurement values ($M_1$; $M_2$) and filter output signals ($R_{F1}$; $R_{F2}$);

wherein a particular parameter (EG) of the mathematical formula used in the computing unit is changed in accordance with this difference (WM-WR).

3. Apparatus according to claim 2, wherein the filter is a second-order low-pass filter.

4. Apparatus according to claim 2, wherein a maximum value for the averaged difference in the first unit is predetermined.

5. Apparatus according to claim 2, wherein, in the second correction unit, the difference (WM—WR) between the differences (WM; WR) is only formed if the measurement value and/or the mathematical value of the variable characterizing the steady-state driving condition has changed by more than a predetermined minimum value in a particular time interval (Wt).

6. Apparatus according to claim 5, wherein an output signal of the second correction unit is output if the difference formed deviates from the value "0" or is outside a predetermined tolerance range around the value "0".

7. Apparatus according to claim 2, wherein the value of the particular parameter (EG) is increased or decreased by the output signal, depending on whether the difference formed is greater than or less than the value "0" or its tolerance range.

8. Apparatus according to claim 6, wherein the value of the particular parameter (EG) is increased or decreased by the output signal, depending on whether the difference formed is greater than or less than the value "0" or its tolerance range.

9. Apparatus according to claim 7, wherein the parameter (EG) is increased or decreased by a predetermined amount or proportion when an output signal of the second correction unit is present.

10. Apparatus according to claim 8, wherein the parameter (EG) is increased or decreased by a predetermined amount or proportion when an output signal of the second correction unit is present.

11. Apparatus according to claim 7, wherein the parameter (EG) is increased or decreased at a predetermined maximum rate.

12. Apparatus according to claim 9, wherein the parameter (EG) is increased or decreased at a predetermined maximum rate.

13. Apparatus according to claim 2, wherein the difference between successive filter output signals can be limited to a predetermined maximum value in the second correction unit.

14. Apparatus according to claim 2, wherein, when an output signal (ST) of the comparison unit is present, the correction of the mathematical value ($R_F$) in the first correction unit is blocked and output signals of the second correction unit are suppressed.

15. Apparatus according to claim 7, wherein, when an output signal (ST) of the comparison unit is present, the correction of the mathematical value ($R_F$) in the first correction unit is blocked and output signals of the second correction unit are suppressed.

16. Apparatus according to claim 9, wherein, when an output signal (ST) of the comparison unit is present, the correction of the mathematical value ($R_F$) in the first correction unit is blocked and output signals of the second correction unit are suppressed.

* * * * *